(12) United States Patent
Cox et al.

(10) Patent No.: US 10,845,229 B2
(45) Date of Patent: Nov. 24, 2020

(54) MONITORING SYSTEM AND METHOD

(71) Applicant: Edwards Vacuum LLC, Sanborn, NY (US)

(72) Inventors: Calvin Michael Cox, Hillsboro, OR (US); David Wren Dupre, Hillsboro, OR (US); Mark Kollin Romeo, Hillsboro, OR (US)

(73) Assignee: Edwards Vacuum LLC, Sanborn, NY (US)

( * ) Notice: Subject to any disclaimer, the term of this patent is extended or adjusted under 35 U.S.C. 154(b) by 198 days.

(21) Appl. No.: 16/032,746

(22) Filed: Jul. 11, 2018

(65) Prior Publication Data
US 2020/0018630 A1 Jan. 16, 2020

(51) Int. Cl.
G01F 23/20 (2006.01)
G01F 25/00 (2006.01)
G01G 17/06 (2006.01)

(52) U.S. Cl.
CPC .......... G01F 23/20 (2013.01); G01F 25/0069 (2013.01); G01G 17/06 (2013.01)

(58) Field of Classification Search
CPC ............................ G01F 23/20; G01F 25/0069
USPC .......................................................... 73/296
See application file for complete search history.

(56) References Cited

U.S. PATENT DOCUMENTS

| 9,296,603 B1* | 3/2016 | Cole | ........................ B67D 7/36 |
| 2003/0057576 A1 | 3/2003 | Tong et al. | |
| 2007/0056368 A1* | 3/2007 | Schneiter | ................. G01F 23/20 73/296 |
| 2009/0038393 A1* | 2/2009 | Chaung | ............... G01F 23/2921 73/290 R |
| 2013/0025377 A1* | 1/2013 | Ozawa | ................... B60N 2/002 73/862.621 |
| 2013/0042919 A1* | 2/2013 | Lambke | .................... F17D 3/00 137/1 |

(Continued)

FOREIGN PATENT DOCUMENTS

| CN | 208458836 U | 2/2019 |
| EP | 1154244 A1 | 11/2001 |
| GB | 2510798 A | 8/2014 |

(Continued)

OTHER PUBLICATIONS

PCT International Search Report and Written Opinion dated Dec. 18, 2019 for corresponding PCT Application Serial No. PCT/IB2019/055873.

(Continued)

Primary Examiner — Tarun Sinha
(74) Attorney, Agent, or Firm — Theodore M. Magee; Westman, Champlin & Koehler, P.A.

(57) ABSTRACT

The present disclosure relates to an abatement apparatus monitoring system. The abatement apparatus monitoring system includes a processor; and at least one load cell for outputting a load cell signal to the processor. The at least one load cell is configured to support a waste tank of an abatement apparatus. The processor is configured to monitor a level of a liquid in the waste tank in dependence on the load cell signal. The present disclosure also relates to an abatement system comprising an abatement apparatus monitoring system; and a method of monitoring operation of an abatement system.

14 Claims, 6 Drawing Sheets

(56) References Cited

U.S. PATENT DOCUMENTS

2015/0300873 A1* 10/2015 Kjar .................. G01G 19/22
                                                     73/862.382
2016/0003660 A1    1/2016 Martinez

FOREIGN PATENT DOCUMENTS

| JP | 2012217946 A | 11/2012 |
| KR | 1020040032491 | 3/2006 |
| KR | 101672121 B1 | 11/2016 |

OTHER PUBLICATIONS

Combined Search and Examination Report dated May 16, 2019 for corresponding British application Serial No. GB1819255.9.

* cited by examiner

MONITORING SYSTEM AND METHOD

TECHNICAL FIELD

The present disclosure relates to a monitoring system and method. More particularly, but not exclusively, the present disclosure relates an abatement system monitoring system and method.

BACKGROUND

A gas abatement system may utilise one or more water scrubber. The wastewater may be collected in a wastewater tank. The level of the liquid in the wastewater tank is monitored to control a drain/fill cycle. The liquid level may be monitored using one or more float switches disposed at different heights in the wastewater tank. A potential problem with such an arrangement is that the float switch may be subject to failure resulting in an error state. The float switch may, for example, become stuck in an ON position or an OFF position. The float switch may be exposed to foam on the surface of the wastewater which will build up over time and may adversely affect the mechanical parts and/or sensor mechanism. Different types of sensors (including optical, differential pressure, radio frequency, etc.) may all experience issues due to process build-up in the waste tank.

A method or system for monitoring a liquid level in the waste tank of an abatement system which overcomes or ameliorates at least some of the aforementioned problems would be advantageous.

The discussion above is merely provided for general background information and is not intended to be used as an aid in determining the scope of the claimed subject matter. The claimed subject matter is not limited to implementations that solve any or all disadvantages noted in the background.

SUMMARY OF THE INVENTION

According to an aspect of the present invention there is provided an abatement apparatus monitoring system including a processor and at least one load cell for outputting a load cell signal to the processor, the at least one load cell being configured to support a waste tank of an abatement apparatus. The processor is configured to monitor a level of a liquid in the waste tank in dependence on the load cell signal.

According to a further aspect of the present invention there is provided a method of monitoring an abatement apparatus having a waste tank. The method includes using at least one load cell to measure a weight of the waste tank and monitoring a level of a liquid in the waste tank in dependence on the measured weight of the waste tank.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

One or more embodiments of the present invention will now be described, by way of example only, with reference to the accompanying figures, in which.

DETAILED DESCRIPTION

Figure 1:
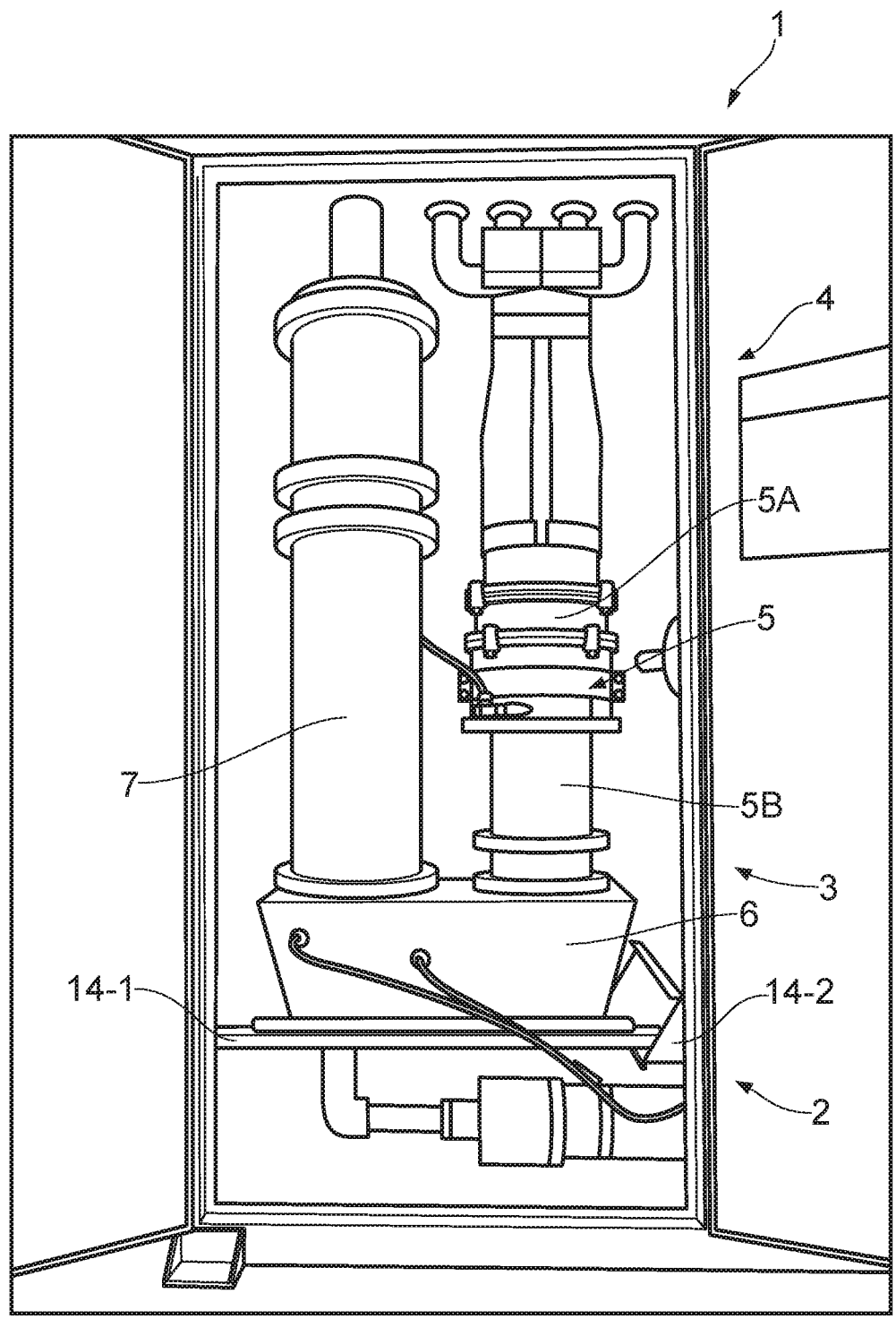
FIG. 1 shows a schematic representation of an abatement system comprising a monitoring system in accordance with an embodiment of the present invention.

According to an aspect of the present invention there is provided an abatement apparatus monitoring system including a processor and at least one load cell for outputting a load cell signal to the processor, the at least one load cell being configured to support a waste tank of an abatement apparatus. The processor is configured to monitor a level of a liquid in the waste tank in dependence on the load cell signal. At least in certain embodiments, the abatement apparatus monitoring system may enable the level of the liquid in the waste tank to be monitored using at least one sensor in the form of a load cell which is located outside the waste tank. Thus, the at least one sensor is not exposed to the liquid in the waste tank during normal operation.

The processor may monitor the level of the liquid in the waste tank by determining a weight or volume of the liquid in the waste tank.

One or more threshold may be defined to control operation of the abatement apparatus in dependence on the level of liquid in the waste tank. The processor may output a first control signal to the abatement apparatus when the level of liquid is greater than or equal to a first threshold. The first control signal may initiate a drain cycle, for example by opening a drain valve. The processor may output a second control signal to the abatement apparatus when the level of liquid is less than or equal to a second threshold. The second control signal may initiate a fill cycle, for example by closing a drain valve and/or supplying a liquid to the waste tank.

The processor may have a first input for receiving a first signal from a first sensor disposed in the waste tank. The processor may be configured to calibrate the abatement apparatus monitoring system in dependence on the first signal. The first sensor may, for example, comprise a first float switch. Other types of sensor may be used to determine the level of the liquid in the waste tank. The first liquid sensor may comprise a low liquid level switch, the processor being configured to calibrate a low liquid level in dependence on the first signal.

The processor may have a second input for receiving a second signal from a second level sensor disposed in the waste tank. The processor may be configured to calibrate the abatement apparatus monitoring system in dependence on the second level signal. The second sensor may, for example, comprise a second float switch. Other types of sensor may be used to determine the level of the liquid in the waste tank. The second sensor may comprise a high liquid level sensor. The processor may be configured to calibrate a high liquid level in dependence on the second signal.

The processor may have a third input for receiving a third signal from a third level sensor disposed in the waste tank. The processor may be configured to calibrate the abatement apparatus monitoring system in dependence on the third level signal. The third sensor may, for example, comprise a third float switch.

The processor may be configured to output a fill control signal to initiate a fill cycle when the load cell signal indicates a liquid level in the waste tank which is less than or equal to a lower threshold. The fill cycle may be initiated by closing a drain valve.

The processor may be configured to output a drain control signal to initiate a drain cycle when the load cell signal indicates a liquid level in the waste tank which is greater than or equal to an upper threshold. The drain cycle may be initiated by opening a drain valve.

The abatement apparatus monitoring system may comprise support means for supporting the waste tank. The support means may be carried by the at least one load cell. The support means may comprise a load plate for supporting the waste tank. The load plate may be fixedly mounted. Alternatively, the load plate may be movably mounted, for example to translate in a horizontal direction.

The load plate may be carried by the at least one load cell.

The load plate may be movably mounted. For example, the load plate may be movably mounted on first and second guide members. The first and second guide members may be carried by the at least one load cell.

The abatement apparatus monitoring system may comprise a plurality of said load cells.

The waste tank may be a wastewater tank for collecting wastewater, for example from a water scrubber.

According to a further aspect of the present invention there is provided an abatement apparatus monitoring system including a processor and at least one load cell for outputting a load cell signal to the processor, the at least one load cell being configured to support a waste tank of an abatement apparatus. The processor is configured to control a drain/fill cycle in dependence on the load cell signal. The processor may be configured to output one or more control signals to initiate or terminate the drain/fill cycle in dependence on the load cell signal.

According to a further aspect of the present invention there is provided an abatement system including an abatement apparatus monitoring system as described herein. The abatement apparatus may include a waste tank for receiving a waste liquid, such as waste water, from an abatement process. A drain valve may be provided for controllably draining of the waste tank.

The waste tank may be supported by on a support means. For example, the waste tank may be supported on a load plate. The waste tank may form a component part of the abatement apparatus. The abatement apparatus (including the waste tank) may be supported on the load plate. The load cell signal may provide an indication of the combined weight of the abatement apparatus and the waste tank.

The calibration of the abatement apparatus monitoring system may comprise determining a weight of the abatement apparatus disposed on the support means. For example, a reference weight (or a "dry" weight, i.e. without liquids) of the abatement apparatus may be determined. Alternatively, or in addition, the reference weight (or the "dry" weight) of the abatement apparatus may be predefined.

The level of the liquid in the waste tank may be estimated in dependence on a change in the measured weight. For example, the level of the liquid in the waste tank may be determined as corresponding to a determined increase in the measured weight above the reference weight.

The abatement system may comprise a control unit. The control unit may be configured to receive one or more signal from the abatement apparatus monitoring system.

The abatement apparatus may include a waste tank. The control unit may be configured to output a control signal for controlling draining of the waste tank; and/or a supply of liquid to the waste tank.

The abatement apparatus may include a drain valve for controllably draining the waste tank. The control unit may be configured to control opening and closing of the drain valve.

At least one level sensor may be disposed in the waste tank. The control unit may be configured to receive a signal from each said level sensor. The control unit may control the drain valve in dependence on a signal received from the at least one level sensor disposed in the waste tank. Each level sensor may, for example, comprise a float switch.

Alternatively, or in addition, the control valve may control the drain valve in dependence on a control signal received from the abatement apparatus monitoring system.

According to a further aspect of the present invention there is provided a method of monitoring an abatement apparatus having a waste tank. The method includes using at least one load cell to measure a weight of the waste tank and monitoring a level of a liquid in the waste tank in dependence on the measured weight of the waste tank. The method may include determining a level of the liquid in the waste tank and/or a volume of the liquid in the waste tank. The method may include outputting a control signal to control operation of the abatement apparatus, for example to begin or end a drain/fill cycle. The control signal may be generated in dependence on the measured weight of the waste tank.

The method may include determining a first weight of the waste tank when the liquid in the waste tank is at a first predetermined level. The at least one load cell may be calibrated in dependence on the determined first weight of the waste tank.

The method may include determining a second weight of the waste tank when the liquid in the waste tank is at a second predetermined level. The at least one load cell may be calibrated in dependence on the determined second weight of the waste tank.

The waste tank may form a component part of the abatement apparatus. The method may comprise measuring the weight of the abatement apparatus and the waste tank.

According to a further aspect of the present invention there is provided a method of controlling an abatement apparatus having a waste tank. The method includes using at least one load cell to measure a weight of the waste tank and outputting a control signal to control operation of the abatement apparatus in dependence on the measured weight of the waste tank.

According to a further aspect of the present invention there is provided a non-transitory computer-readable medium having a set of instructions stored therein which, when executed, cause a processor to perform the method(s) described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

An abatement system 1 comprising a monitoring system 2 in accordance with an embodiment of the present invention will now be described with reference to FIGS. 1 to 4.

The abatement system 1 is a gas abatement system for performing combustion decomposition, for example to process gases in the semiconductor industry. The abatement system 1 performs scrubbing of the combustion gases to collect dust. The abatement system 1 may process gases such as silane (used as a semiconductor material gas), and gaseous fluoride (which may be used as a cleaning gas, for example in plasma cleaning of chambers of a chemical vapour deposition (CVD) apparatus). As shown in FIG. 1, the abatement system 1 comprises abatement apparatus 3 and a housing 4. The abatement apparatus 3 comprises a combustion furnace 5, a waste tank 6, a scrubber 7 and a control unit 8 (shown in FIG. 3). The combustion furnace 5 comprises a combustion chamber 5A and a post-combustion scrubber 5B. As described herein, the monitoring system 2 is operable to monitor the level of the liquid in the waste tank 6. The post-combustion scrubber 5B and the scrubber 7 are typically water scrubbers and the liquid collected in the waste tank 6 is a wastewater W.

Figure 2:
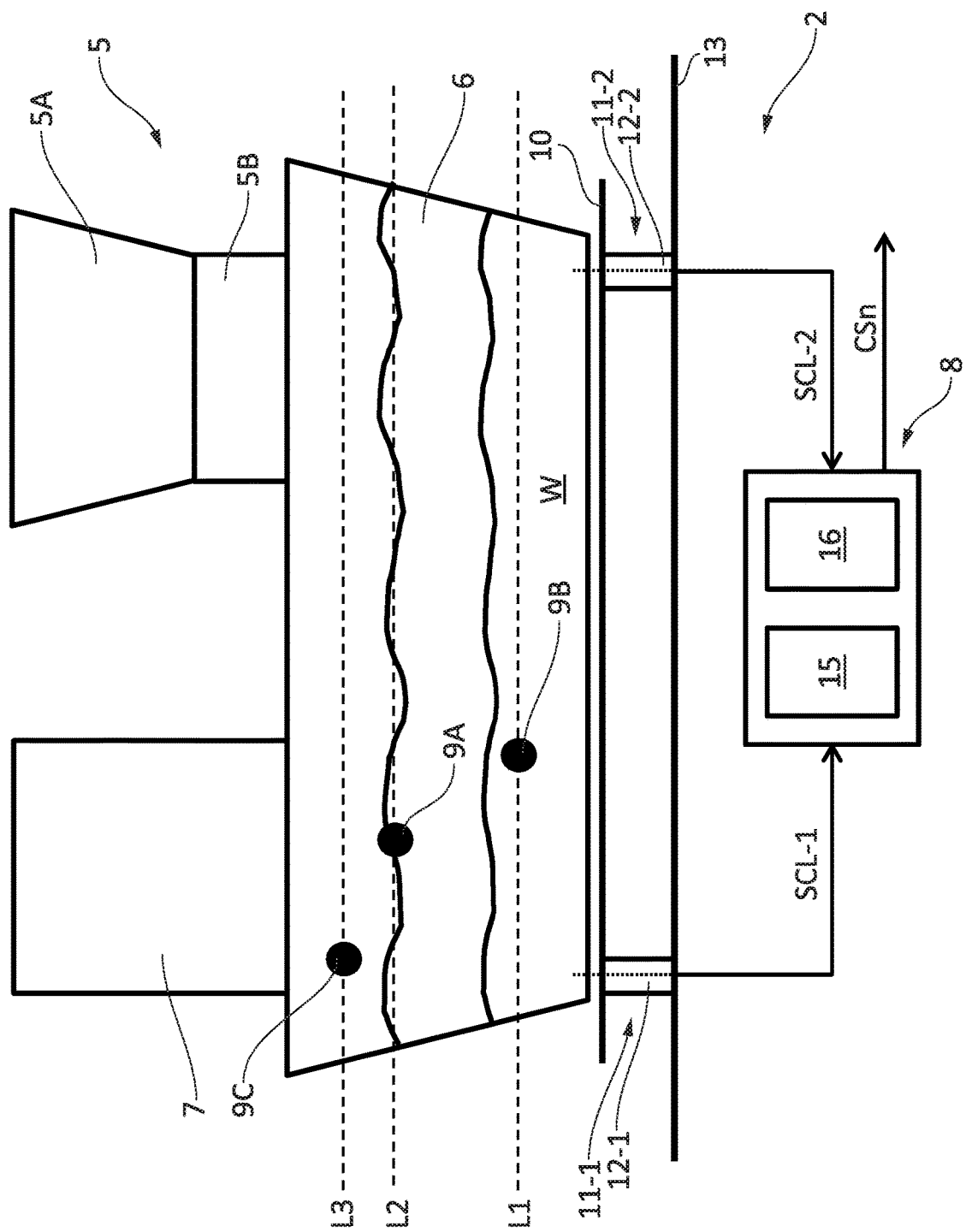
FIG. 2 shows a schematic representation of the waste tank of the monitoring system shown in FIG. 1.

A schematic representation of the waste tank 6 is shown in FIG. 2. In use, the waste tank 6 collects wastewater from the post-combustion water scrubber 5B and the water scrubber 7. The waste tank 6 is drained when the wastewater reaches a predetermined level within the waste tank 6. An upper level switch 9A, a lower level switch 9B, and a back-up (overflow) level switch 9C are provided in the waste tank 6. In the present embodiment, the upper level switch 9A, the lower level switch 9B, and the back-up level switch 9C each comprise a float switch which is operated in dependence on a level of the wastewater in the waste tank 6. The lower level switch 9B is positioned at a vertical height within the waste tank 6 so as to be operated when the wastewater is at a first level L1 corresponding to the lowermost water level for a drain/fill cycle. The upper level switch 9A is positioned at a vertical height within the waste tank 6 so as to be operated when the wastewater is at a second level L2 corresponding to the uppermost water level for a drain/fill cycle. The backup level switch 9C is positioned at a vertical height within the waste tank 6 so as to be operated when the wastewater is at a third level L3 corresponding to a maximum water level. The level switches 9A-C are configured to output respective level switch signals SLS-1, SLS-2, SLS-3 to the monitoring system 2. The level switch signals SLS-1, SLS-2, SLS-3 are indicative of activation of the respective level switches 9A-C. It will be understood that one or more of the level switches 9A-C may be omitted.

The monitoring system 2 comprises support means for supporting the abatement apparatus 3. The support means in the present embodiment comprises a load plate 10 on which the abatement apparatus 3, including the waste tank 6, is disposed. The monitoring system 2 is operable to monitor a liquid level in the waste tank 6. The monitoring system 2 monitors the liquid level in dependence on a measured weight of the abatement apparatus 3, inclusive of the waste tank 6. As described herein, the liquid level in the waste tank 6 can be calibrated for different measured weights of the abatement apparatus 3. Alternatively, a volume of the liquid in the waste tank 6 may be determined by subtracting a "dry" weight of the abatement apparatus 3 (i.e. a weight without liquids or a weight with the waste tank 6 substantially empty) from the measured weight to determine a weight of the liquid in the waste tank 6.

The monitoring system 2 comprises four (4) load cells 11-1, 11-2, 11-3, 11-4 arranged to carry the load plate 10. Each load cell 11-1, 11-2, 11-3, 11-4 comprises a mounting member 12-1, 12-2, 12-3, 12-4, such as a rod or pin, which extends substantially vertically. The load plate 10 is fastened to the mounting members 12-1, 12-2, 12-3, 12-4 which of the load cells 11-1, 11-2, 11-3, 11-4, for example by a suitable mechanical fastener. The load plate 10 is supported exclusively by the load cells 11-1, 11-2, 11-3, 11-4 which are configured to constrain or inhibit movement of the load plate 10 in a horizontal plane (either from side-to-side or from front-to-back). The load cells 11-1, 11-2, 11-3, 11-4 are operable to weigh the load plate 10 and the waste tank 6, thereby enabling determination of the level of the water in the waste tank 6. In the present embodiment, the load cells 11-1, 11-2, 11-3, 11-4 each comprise a strain gauge transducer, but other types of transducer may be used. The load cells 11-1, 11-2, 11-3, 11-4 are mounted to a shelf 13 fixedly mounted to first and second brackets 14-1, 14-2 disposed on opposing sides of the housing 4. The load plate 10 is rectangular and the load cells 11-1, 11-2, 11-3, 11-4 are arranged to support respective corners thereof. The load plate 10 is supported by the load cells 11-1, 11-2, 11-3, 11-4 so as to be spaced apart from the shelf 13. The load cells 11-1, 11-2, 11-3, 11-4 output respective load cell signals SLC-1, SLC-2, SLC-3, SLC-4 to the monitoring system 2. The load cell signals SLC-1, SLC-2, SLC-3, SLC-4 indicate a measured resistance of the strain gauges in the load cells 11-1, 11-2, 11-3, 11-4 which is indicative of the load applied to the load plate 10. In a variant, the load plate 10 may be omitted and the waste tank 6 supported directly by the load cells 11-1, 11-2, 11-3, 11-4. The load cells 11-1, 11-2, 11-3, 11-4 enable a level of the liquid in the waste tank 6 to be determined indirectly.

Figure 3:
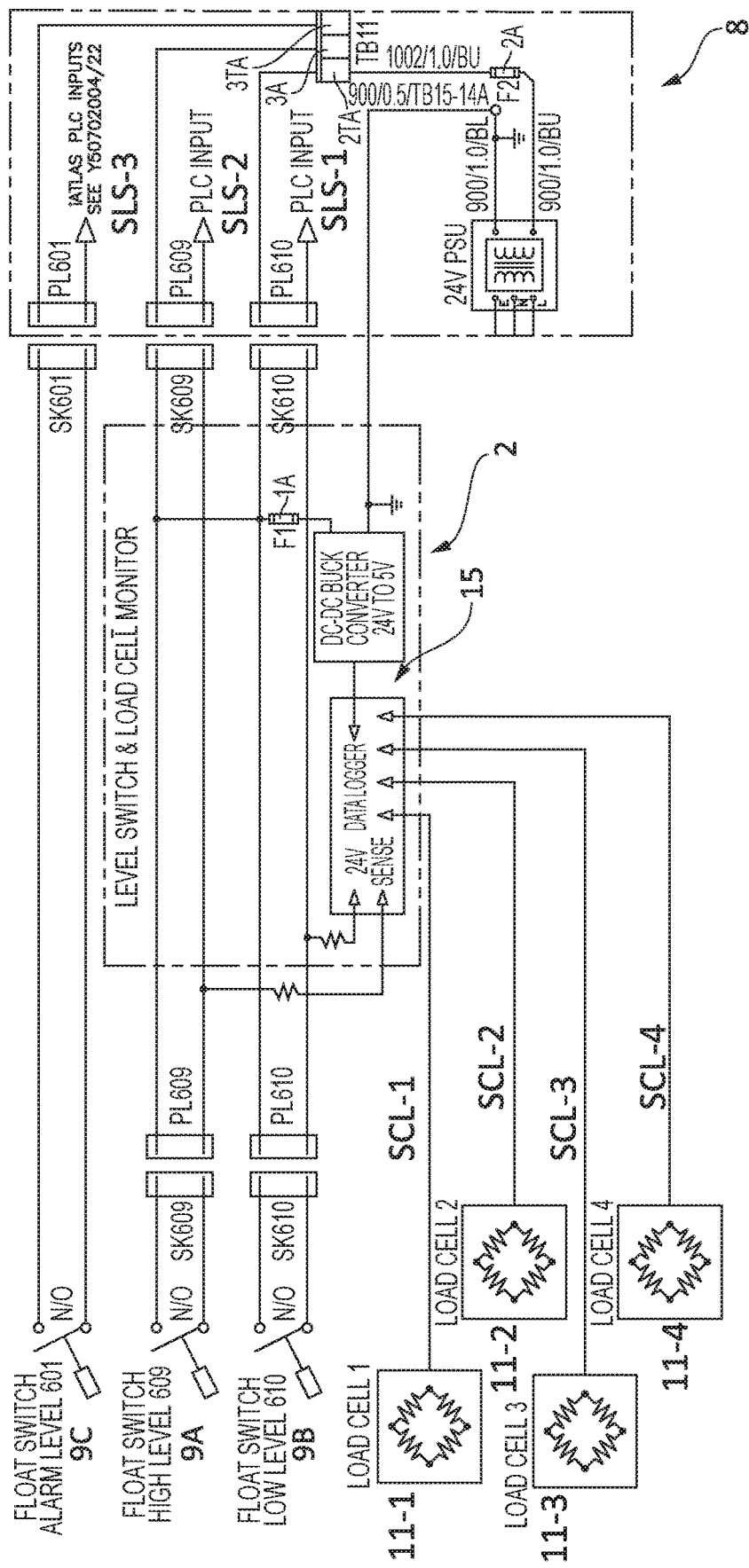
FIG. 3 shows a schematic representation of the monitoring system shown in FIG. 1.
Figure 4:
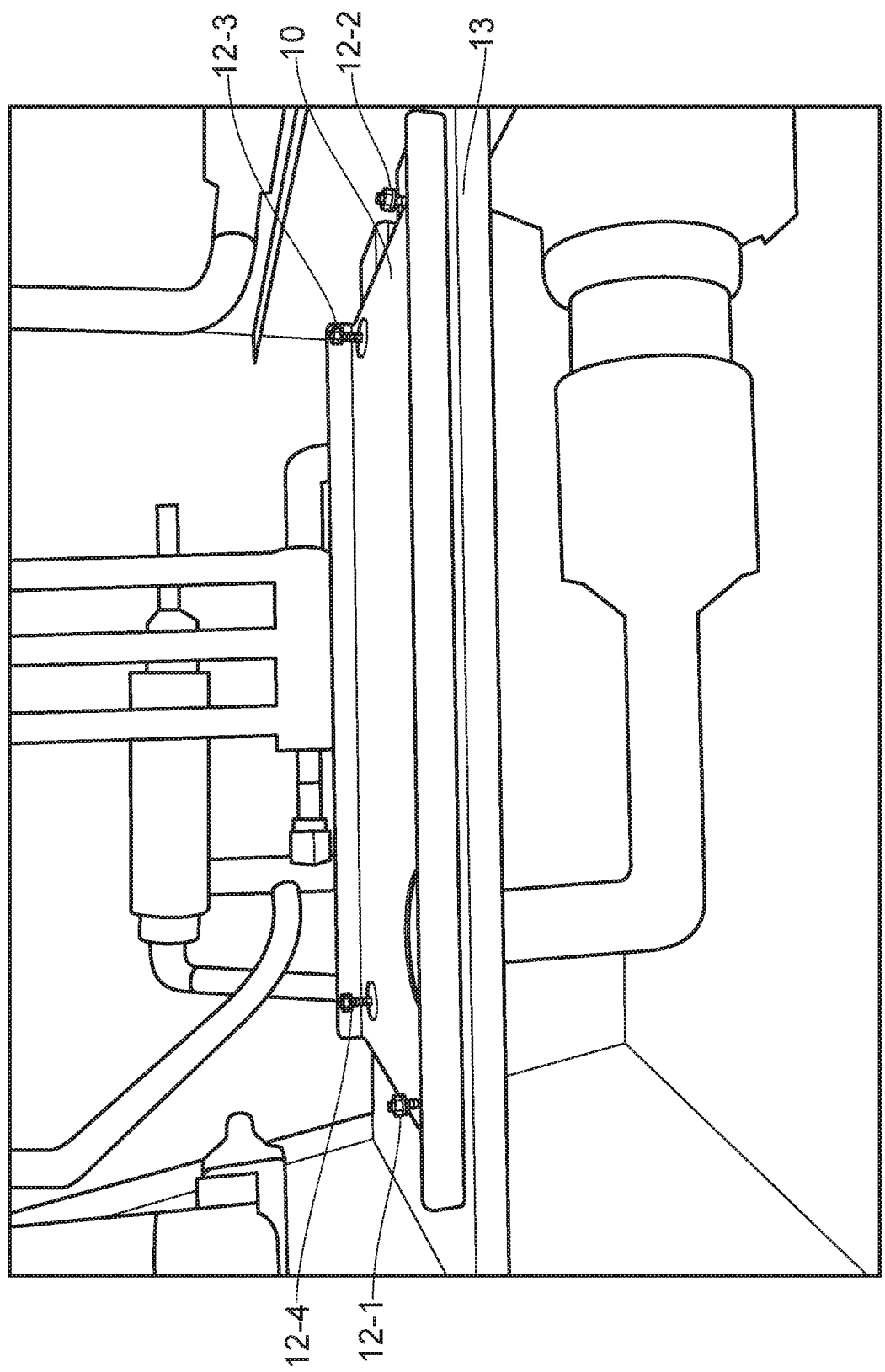
FIG. 4 shows the mounting arrangement of a load plate of the monitoring system shown in FIG. 1.

The connections between the monitoring system 2, the control unit 8, the level switches 9A-C and the load cells 11-1, 11-2, 11-3, 11-4 are shown in FIG. 3. The monitoring system 2 comprises processing means in the form of a processor 15. The processor 15 is coupled to a system memory 16. A set of computational instructions is stored on the system memory 16 for controlling operation of the processor 15. The processor 15 is configured to receive the level switch signals SLS-1, SLS-2, SLS-3 and the load cell signals SLC-1, SLC-2, SLC-3, SLC-4. The monitoring system 2 is operable in a calibration mode to calibrate the load cells 11-1, 11-2, 11-3, 11-4; and a control mode for controlling operation of the drain/fill cycle of the abatement system 1. The processor 15 may operate in said control mode to provide redundancy for the control unit 8, for example in the event that one of the level switches 9A-C develops a fault. The processor 15 may be used as a back-up for one or more of the level switches 9A-C. It will be understood that the control mode could be implemented as a primary control function or as a sole control function, thereby enabling the omission of one or more of the level switches 9A-C.

When operating in the calibration mode, the drain/fill cycle of the abatement system 1 is controlled in dependence on the level switch signals SLS-1, SLS-2, SLS-3. The monitoring system 2 passively monitors the level switch signals SLS-1, SLS-2, SLS-3 and the load cell signals SLC-1, SLC-2, SLC-3, SLC-4. The processor 15 calibrates the load cells 11-1, 11-2, 11-3, 11-4 by logging the load cell signals SLC-1, SLC-2, SLC-3, SLC-4 corresponding to activation of each of the level switches 9A-C. Alternatively, or in addition, load cell signals SLC-1, SLC-2, SLC-3, SLC-4 corresponding to different water levels Ln in the waste tank 6 may be predefined, for example in dependence on empirical data for a particular type or class of abatement system 1. In such a variant, one or more of the level switches 9A-C may be omitted from the waste tank 6.

When operating in the control mode, the drain/fill cycle of the abatement system 1 is controlled in dependence on the load cell signals SLC-1, SLC-2, SLC-3, SLC-4. The monitoring system 2 monitors the load cell signals SLC-1, SLC-2, SLC-3, SLC-4 to determine the level of the wastewater in the waste tank 6. The processor 15 determines the level of the wastewater by comparing the load cell signals SLC-1, SLC-2, SLC-3, SLC-4 to the logged data collected during operation in the calibration mode. When the load cell signals SLC-1, SLC-2, SLC-3, SLC-4 are substantially equal to the logged data for activation of the lower level switch 9B, the processor 15 determines that the wastewater is at the first level L1. When the load cell signals SLC-1, SLC-2, SLC-3, SLC-4 are substantially equal to the logged data for activation of the upper level switch 9A, the processor 15 determines that the wastewater is at the second level L2. When the load cell signals SLC-1, SLC-2, SLC-3, SLC-4 are substantially equal to the logged data for activation of the third level switch 9C, the processor 15 determines that the wastewater is at the third level L3. It will be understood that the processor 15 may use the load cell signals SLC-1, SLC-2, SLC-3, SLC-4 to determine the level of the wastewater in the waste tank 6 at one or more intermediate positions, for example by extrapolating between the calibrated data sets. The processor 15 could be configured to determine the level of the wastewater in the waste tank 6 on a substantially continuous scale in dependence on the load cell signals SLC-1, SLC-2, SLC-3, SLC-4.

The processor 15 is configured to output a control signal CSn to control operation of the abatement system 1. The processor 15 may output a first control signal CS1 to terminate a drain/fill cycle when the determined level of the wastewater is the first level L1. The control unit 8 may, for example, close a drain valve (not shown) in response to receipt of the first control signal CS1. The processor 15 may output a second control signal CS2 to initiate a drain/fill cycle when the determined level of the wastewater is the second level L2. The control unit 8 may, for example, open the drain valve (not shown) in response to receipt of the second control signal CS2. The processor 15 may output a third control signal CS3 to halt or pause operation of the abatement system 1 when the determined level of the wastewater is the third level L3. Alternatively, or in addition, the control unit 8 may open a second drain valve (not shown) in response to receipt of the third control signal CS3.

Figure 5:
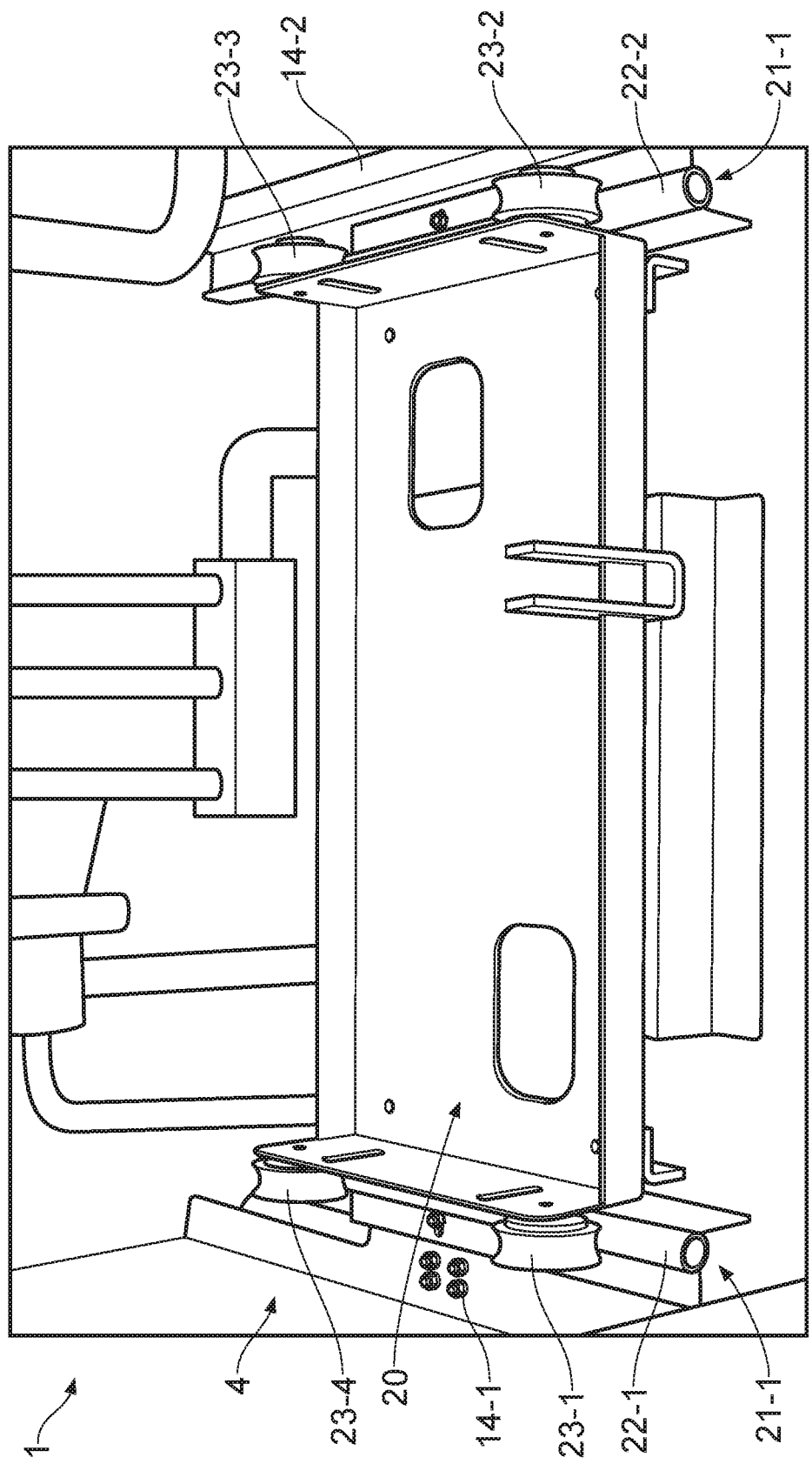
FIG. 5 is a monitoring system in accordance with a further embodiment of the present invention.
Figure 6:
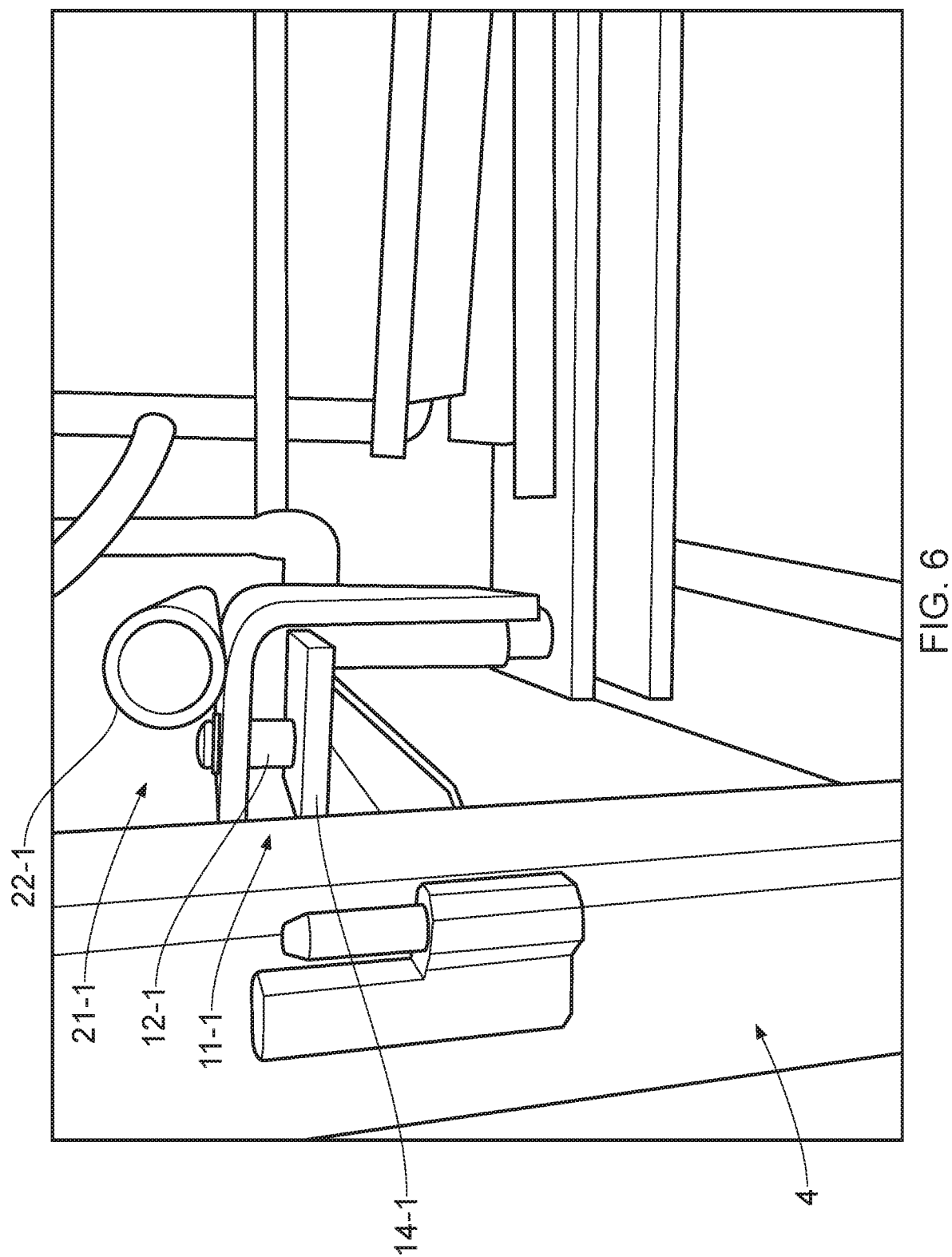
FIG. 6 shows an enlarged view of the mounting arrangement of the load cells of the monitoring system shown in FIG. 5.

A further embodiment of a monitoring system 2 for an abatement system 1 is shown in FIGS. 5 and 6. The monitoring system 2 is a variant of the previous embodiment and the description herein focuses on the changes. Like reference numerals are used for like components.

In the previous embodiment, the load plate 10 is mounted to a shelf 13 fixedly mounted to the housing 4. The abatement system 1 according to the present embodiment comprises a movable load plate 20 which translates relative to the housing 4 to provide improved access. First and second brackets 14-1, 14-2 are fixedly mounted to the housing 4. As shown in FIG. 6, the load cells 11-1, 11-2, 11-3, 11-4 in the present embodiment are mounted to the first and second brackets 14-1, 14-2. In particular, first and second load cells 11-1, 11-2 are mounted to the first bracket 14-1; and third and fourth load cells 11-3, 11-4 are mounted to the second bracket 14-2. First and second guide members 21-1, 21-2 are supported by the mounting members 12-1, 12-2, 12-3, 12-4 of the load cells 11-1, 11-2, 11-3, 11-4. The first and second guide members 21-1, 21-2 are constrained from moving in horizontal plane. The first and second guide members 21-1, 21-2 comprise respective first and second cylindrical members 22-1, 22-2 having central longitudinal axis extending in a front-to-back arrangement within the housing 4. The load plate 20 in the present embodiment is in the form of a shelf which translates relative to the housing 4. The load plate 20 comprises four (4) rotatable wheels 23-1, 23-2, 23-3, 23-4 arranged to travel on the first and second cylindrical members 22-1, 22-2. The load plate 20 is translatable forwards and backwards relative to the housing 4 to provide improved access. A locking mechanism may be provided for locking the load plate 20 in position.

In use, the load cells 11-1, 11-2, 11-3, 11-4 are operable to measure the weight of the waste tank 6. The processor 15 may determine the level of the wastewater in the waste tank 6 using the same techniques described herein with reference to the previous embodiment. It will be understood that one or both of the calibration mode and the control mode may be implemented. It is envisaged that the load plate 20 will be in the same position during normal operation to provide improved consistency.

It will be appreciated that various modifications may be made to the embodiment(s) described herein without departing from the scope of the appended claims. For example, the load plate 20 could be mounted to a movable shelf provided in the housing 3. In this arrangement the load cells 11-1, 11-2, 11-3, 11-4 may be fixedly mounted to the movable shelf rather than to the first and second brackets 14-1, 14-2.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above.

The invention claimed is:

1. An abatement apparatus monitoring system comprising:
   a processor;
   a first sensor disposed in the waste tank and providing a first sensor signal to the processor;

at least one load cell for outputting a load cell signal to the processor, the at least one load cell being configured to support a waste tank of an abatement apparatus;

wherein the processor is configured to:
operate in a calibration mode during which the processor controls a level of liquid in the waste tank based on the first sensor signal, and stores values of the first sensor signal and the load cell signal; and
operate in a control mode during which the processor controls a level of liquid in the waste tank based on the load cell signal and the stored values of the first sensor signal and the load cell signal.

2. The abatement apparatus monitoring system as claimed in claim 1, wherein the first sensor comprises a low liquid level sensor, wherein the stored values of the first sensor signal and the load cell signal are used in the control mode to determine when values of the load cell signal indicate a low liquid level in the waste tank.

3. The abatement apparatus monitoring system as claimed in claim 1, further comprising a second sensor disposed in the waste tank and providing a second sensor signal wherein when operating in the calibration mode the processor uses the second sensor signal when controlling the level of the liquid in the waste tank and stores values of the second sensor signal and when operating in the control mode, the processor controls the level of liquid in the waste tank based on the load cell signal and the stored values of the first sensor signal, the second sensor signal and the load cell signal.

4. The abatement apparatus monitoring system as claimed in claim 3, wherein the second sensor comprises a high liquid level sensor, wherein the stored values of the second sensor signal and the load cell signal are used in the control mode to determine when values of the load cell signal indicate a high liquid level in the waste tank.

5. The abatement apparatus monitoring system as claimed in claim 1, wherein the processor is configured to output a fill control signal to initiate a fill cycle when the load cell signal and the stored values of the first sensor signal and the load cell signal indicate a liquid level in the waste tank which is less than or equal to a lower threshold.

6. The abatement apparatus monitoring system as claimed in claim 3, wherein the processor is configured to output a drain control signal to initiate a drain cycle when the load cell signal and the stored values of the second sensor signal and the load cell signal indicate a liquid level in the waste tank which is greater than or equal to an upper threshold.

7. The abatement apparatus monitoring system as claimed in claim 1, wherein the support means comprises a load plate for supporting the waste tank.

8. The abatement apparatus monitoring system as claimed in claim 1, wherein the load plate is carried by the at least one load cell.

9. The abatement apparatus monitoring system as claimed in claim 7, wherein the load plate is movably mounted on first and second guide members.

10. The abatement apparatus monitoring system as claimed in claim 9, wherein the first and second guide members are carried by the at least one load cell.

11. The abatement apparatus monitoring system as claimed in claim 1 comprising a plurality of said load cells.

12. An abatement system comprising:
an abatement apparatus; and
the abatement apparatus monitoring system as claimed in claim 1.

13. A method of monitoring operation of an abatement system comprising a waste tank, the method comprising:
operating in a calibration mode during which a level sensor signal generated by a level sensor in the waste tank is used to control a liquid level in the waste tank and during which values for the level sensor signal and values for a load cell signal generated by a load cell are stored to produce stored values; and
operating in a control mode during which the load cell signal and the stored values are used to control the liquid level in the waste tank.

14. A non-transitory computer-readable medium having a set of instructions stored therein which, when executed, cause a processor to perform the method claimed in claim 13.

* * * * *